Aug. 1, 1961 W. D. KENNEY 2,994,143
LAND SURFACE PREPARATION MACHINE FOR
SURFACE SHAPING A CULTIVATABLE FIELD
Filed Sept. 18, 1957 7 Sheets-Sheet 5

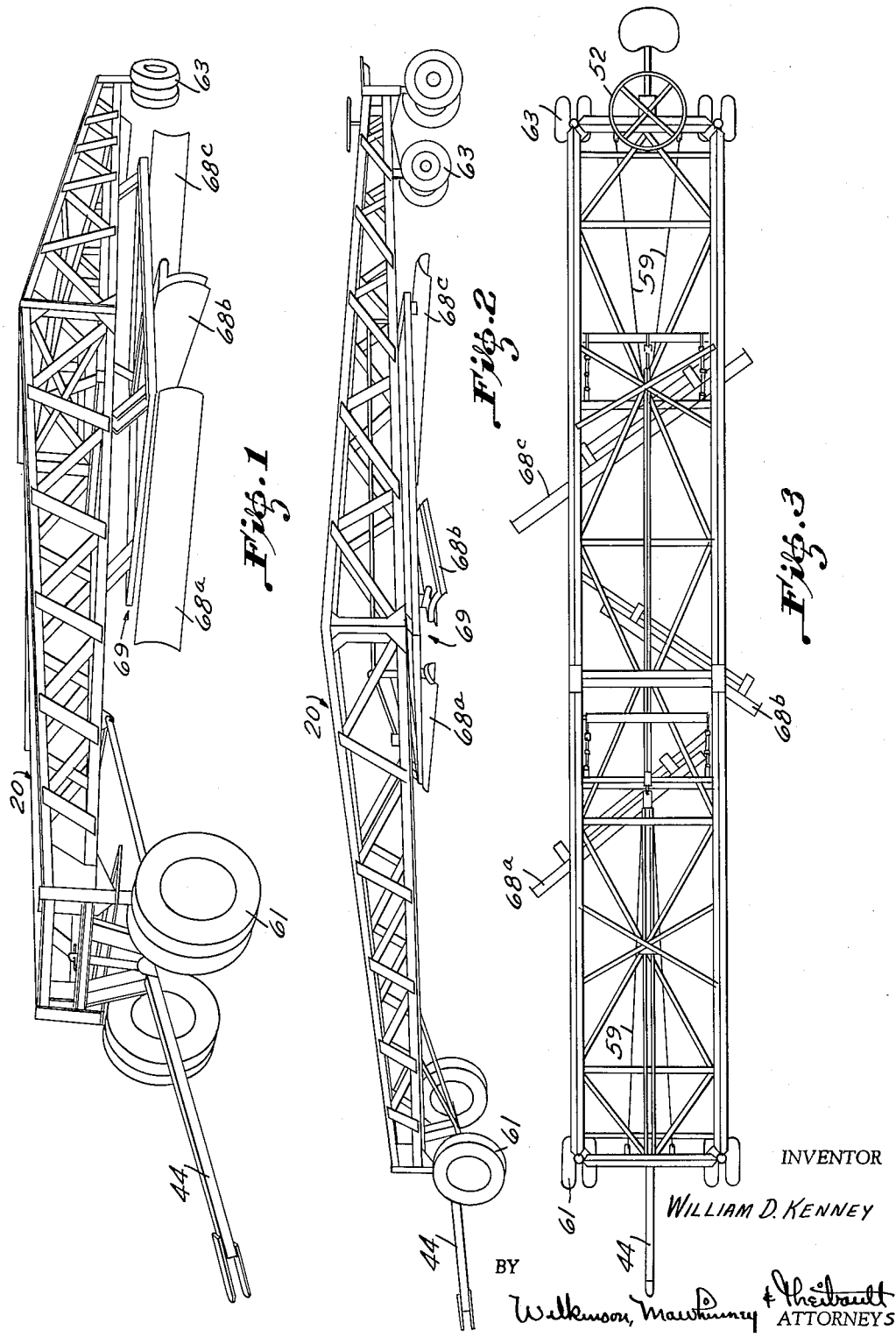

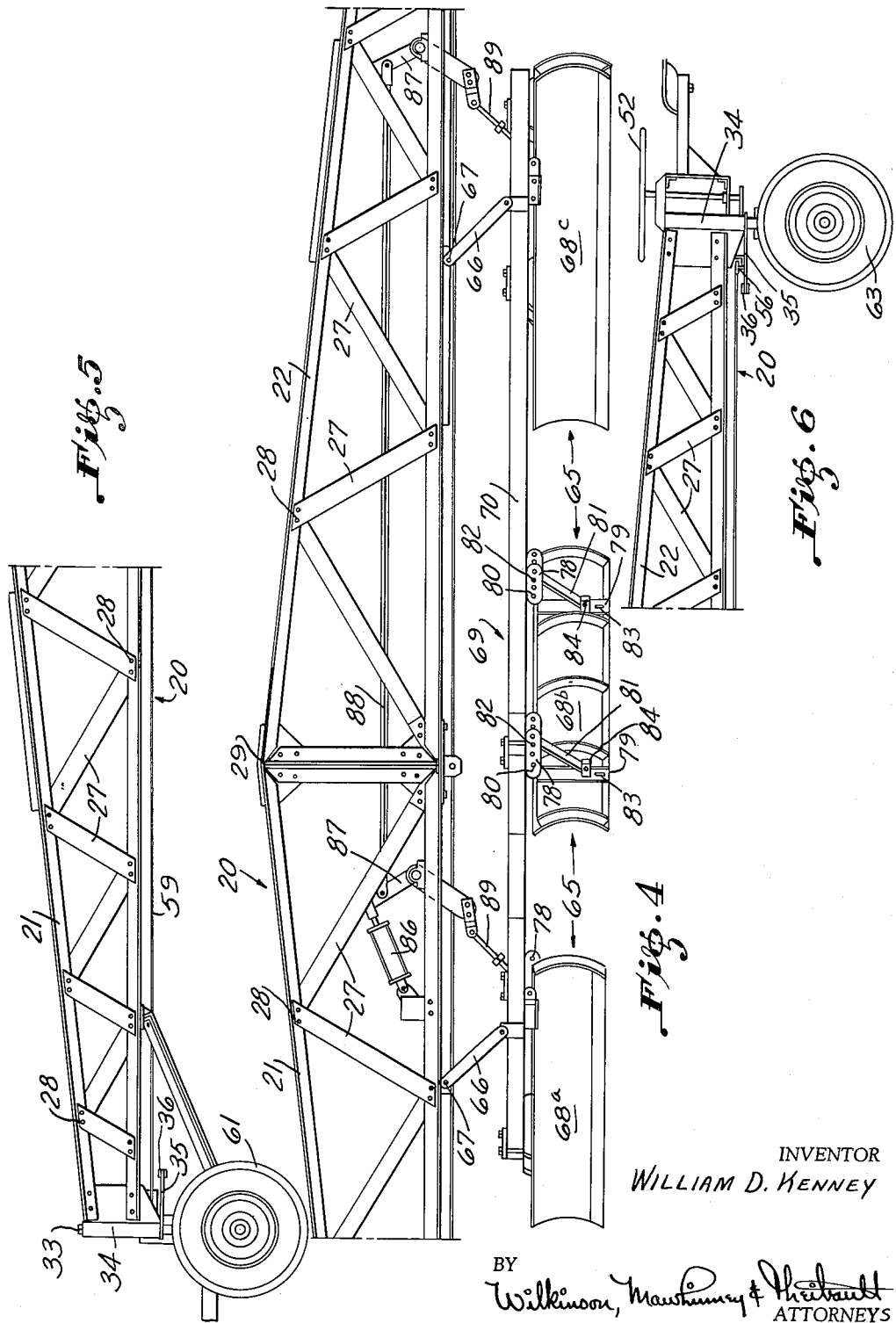

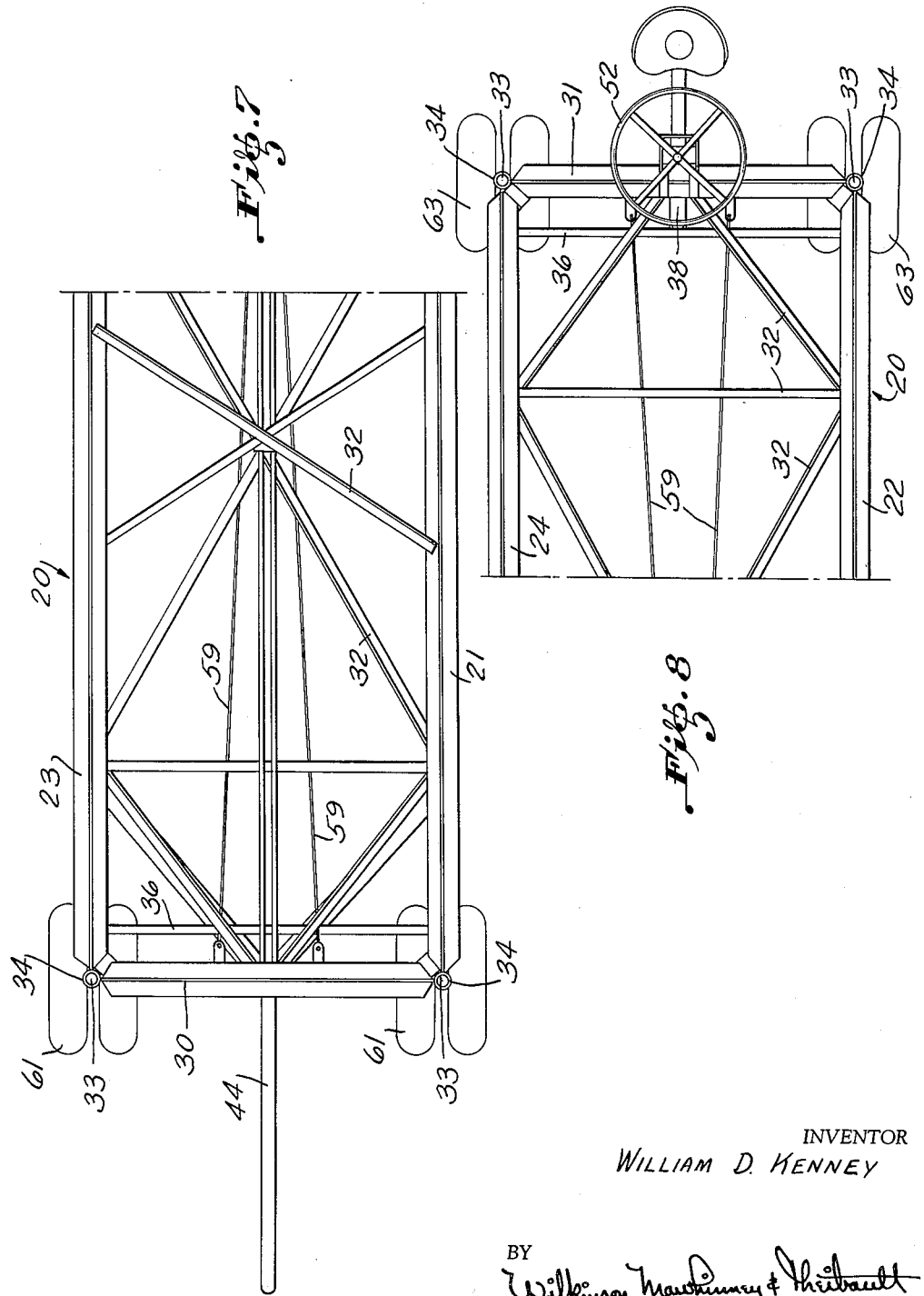

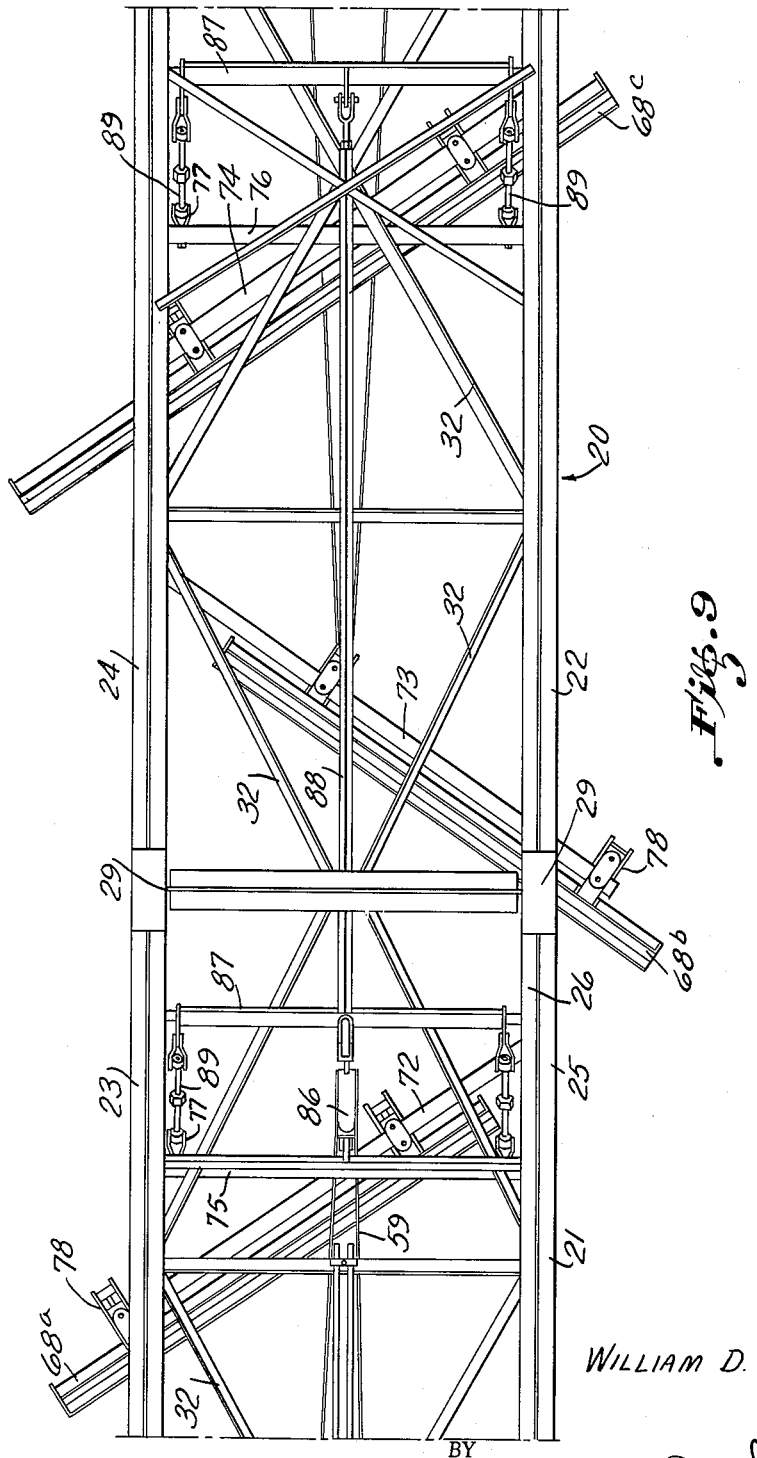

INVENTOR
WILLIAM D. KENNEY

BY
Wilkinson, Mawhinney & Theibault
ATTORNEYS

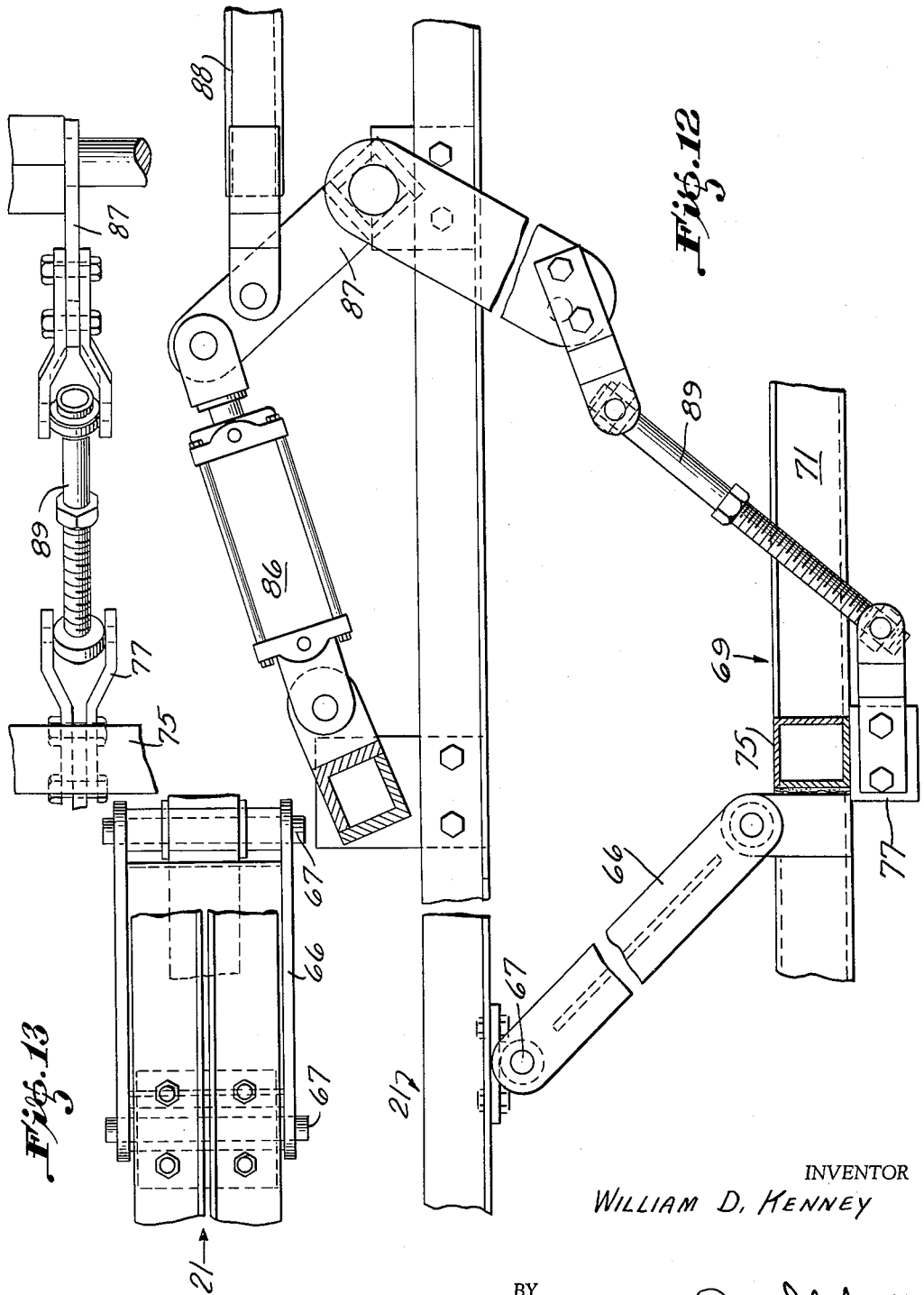

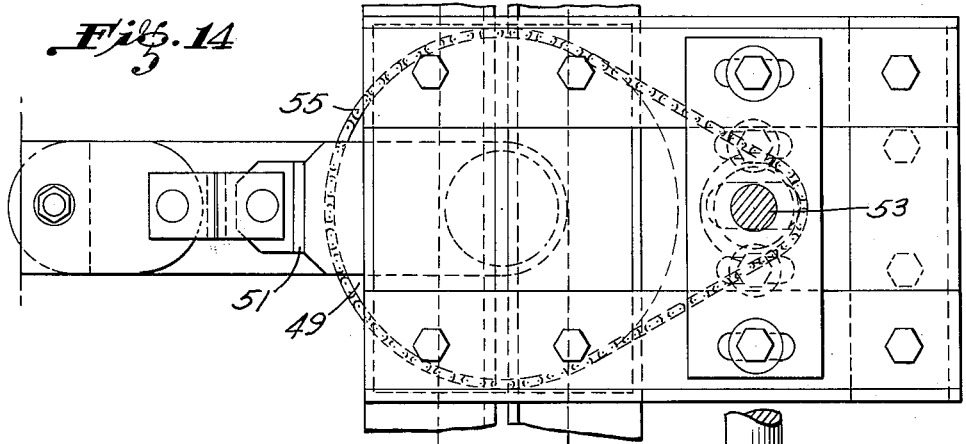
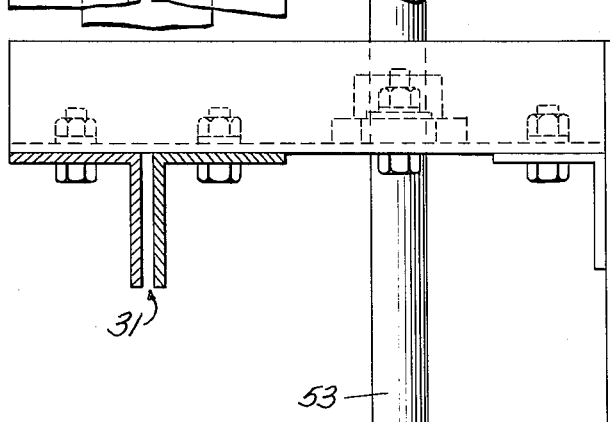
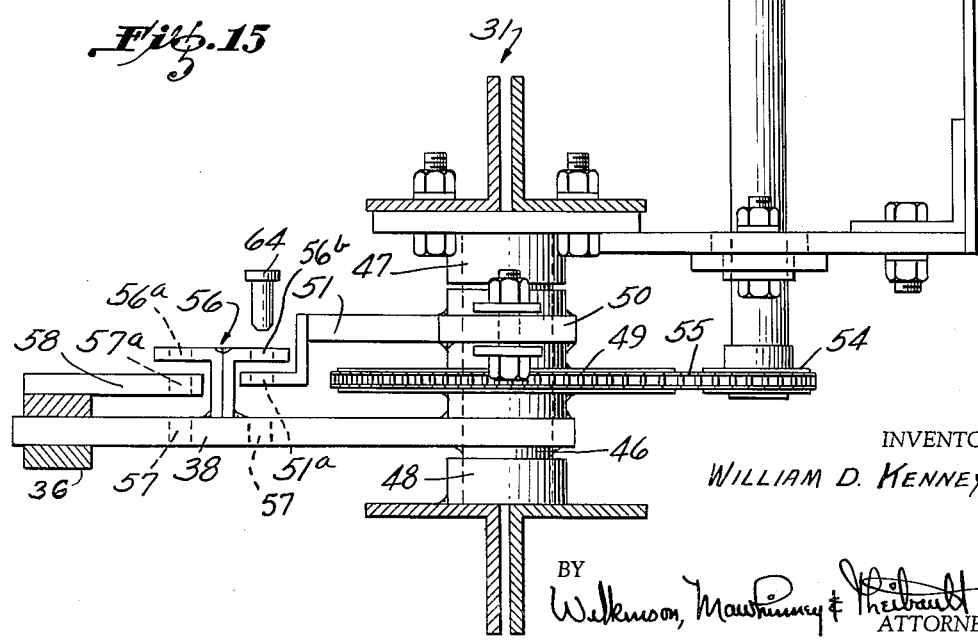

United States Patent Office 2,994,143
Patented Aug. 1, 1961

2,994,143
LAND SURFACE PREPARATION MACHINE FOR SURFACE SHAPING A CULTIVATABLE FIELD
William D. Kenney, Columbus, Ga., assignor to Columbus Iron Works Company, Southern Plow Company Division, Columbus, Ga., a corporation of Georgia
Filed Sept. 18, 1957, Ser. No. 684,736
6 Claims. (Cl. 37—155)

The present invention relates to a land surface preparation machine for surface shaping a cultivatable field which embodies the purposes and operational features of smoothing (often referred to as leveling) the surface of a cultivatable field. The practice of working the surface of a field to bring it into a common plane within its boundaries is referred to by numerous terms such as land leveling, land planing, land forming, and others. For the extent of this instrument the operation will be referred to as surface shaping.

Surface shaping is being practiced for a number of reasons. It is essential for proper surface irrigation as well as proper drainage. It is an aid in the proper land preparation for high speed, precision planting; cultivating; and harvesting of crops. It is desirable in a number of soil conservation practices.

The fundamentals of surface shaping is the moving of soil from the higher places of a specified field and placing it into the lower portions until a common plane throughout the field boundaries has been reached. In some cases the object is to move soil until the particular field is actually level. In other cases the effort is to smooth the surface of the field to a common plane which would not necessarily be on a level.

The art of surface shaping is in some respects related to that of straightening the edge of a board with a carpenter's hand plane. The exception being that the hand plane brings down the high places to the low places whereas the surface shaping brings up the low places as well as down the high places. It is similar to the hand plane in the respect that the greater the effective length, the smoother the edge of the board.

Most implements designed for field surface shaping in some degree depend upon length for their effectiveness. Most such implements have frames longitudinal in design which are supported at each end on wheels.

While length is effective in leveling, it poses a problem in transportation and general maneuverability of the machine. Some conventional models have wheels that are free or semi-free castering. This arrangement generally presents trouble in control during transport and when the machine takes on an unbalanced load of soil across its width during operation. Some conventional machines for transport depend upon disconnecting sections and stacking to shorten length. This often is difficult, time consuming and cumbersome.

At some point between the front and rear supporting wheel a dirt moving blade, mold board, or pan as it is often called, is mounted and operated in various ways. This pan is often mounted at or near the longitudinal center of the frame or somewhere between the center and rear supported points or wheels. It generally is a single pan with cutting edge and covered ends and set perpendicular to the direction of travel. The cutting edge of the pan is set at a determined setting according to the duty of the machine and the available power to pull it. At such a setting the blade cuts the high projections of dirt between the frame supporting points and suspends over the low areas that pass between the front and rear supporting points. Thus the dirt is taken from the higher points, dragged until a depressed area is passed over, and the dirt drops from the pan into this low area.

Many such implements now on the market do a comparatively good job within their capacity. Most of these machines depend upon conditions that frequently are not available for satisfactory performance. Two normal and frequent conditions that cause trouble with a conventional land surface shaping machine with a single pan that is perpendicular with the direction of travel are: (1) trash or vegetation that is on or near the surface; and (2) normal amounts of moisture that is ordinarily present near the surface. Both conditions retard and prevent a normal fall out of the dirt in the low areas and thus continue to build up the load beyond the ability to move it. Thus considerable effort is required to eliminate the trash as well as time lost in drying out the soil prior to the surface shaping operations.

This invention has for an object the reduction and elimination of the problems encountered by conventional machines, of trashy and moisture conditions without the need of special prior preparations.

The invention has for a further object simplicity and ease of operation in the field as well as excellent maneuverability in the field and in safe transport on the road.

With the foregoing and objects in view the invention will be more fully described hereinafter and will be more particularly pointed out in the claims appended hereto.

In the drawings wherein like symbols refer to like or corresponding parts throughout the several views:

FIGURE 1 is a perspective view of the machine constructed in accordance with the present invention having the subframe and mold boards in lowered working position.

FIGURE 2 is a perspective view of the machine of FIGURE 1 with the subframe and mold boards in elevated transport condition.

FIGURE 3 is a top plan view of the machine constructed in accordance with FIGURE 1.

FIGURE 4 is a fragmentary side elevational view of the machine of FIGURE 1 taken at an enlarged scale.

FIGURE 5 is a fragmentary side elevational view of the left hand end of FIGURE 4.

FIGURE 6 is a fragmentary side elevational view of the rear portion taken from the right hand end of FIGURE 4.

FIGURE 7 is a top plan view of a portion of the machine of FIGURE 9 from the left hand end thereof.

FIGURE 8 is a top plan view of the rear portion of the machine of FIGURE 9 at the right hand thereof.

FIGURE 9 is a top plan view of the central portion of the machine of FIGURE 1 taken at an enlarged scale.

FIGURE 12 is a fragmentary side elevational view with parts broken away and parts shown in section, taken at an enlarged scale of the machine of FIGURE 4 showing the lifting or elevating mechanism of the subframe assembly.

FIGURE 13 is a fragmentary top plan view of FIGURE 12.

FIGURE 14 is a top plan view with parts broken away and parts shown in section, taken at a magnified scale of the rear steering mechanism of the invention of FIGURES 1 and 2.

FIGURE 15 is a side elevational view of the rear steering mechanism having parts broken away and parts shown in section, at an enlarged scale.

Figure 10:
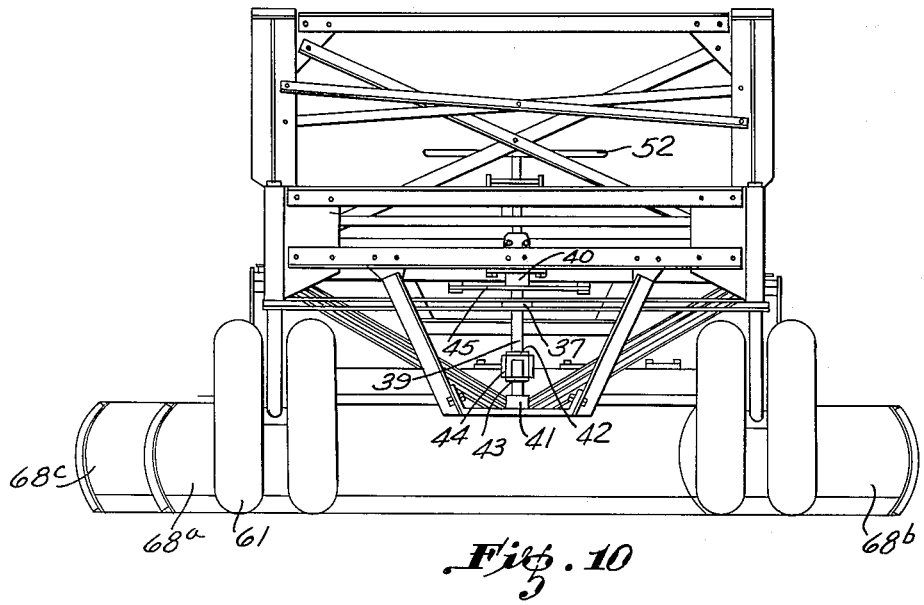
FIGURE 10 is a front elevational view taken at an enlarged scale of the machine of FIGURES 1 and 4 through 6 inclusive.
Figure 11:
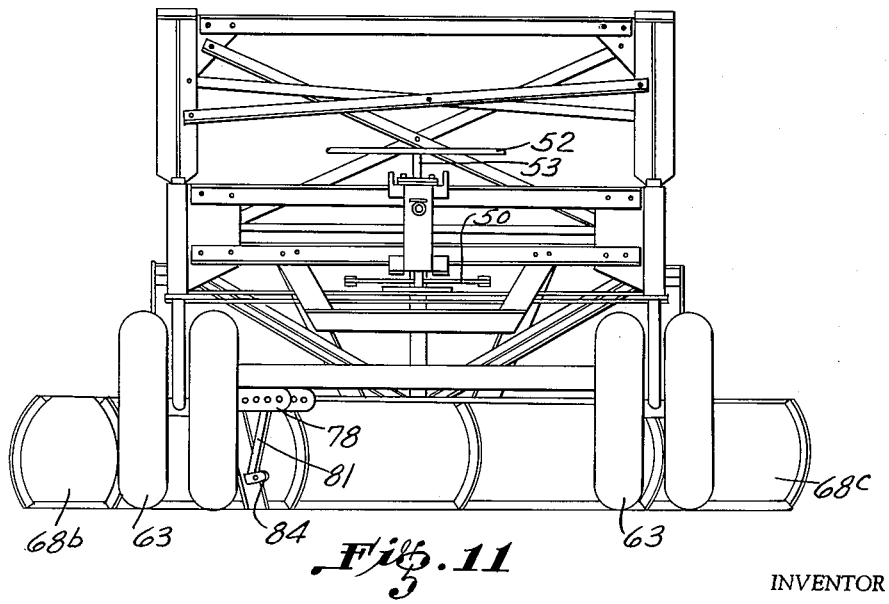
FIGURE 11 is a rear elevational view of the machine of FIGURE 10.

Referring more particularly to the drawing, FIGURES 5 through 9, the main frame 20 is comprised principally of four identical built trusses 21, 22, 23, 24. These trusses are made by bolting two angles 25, 26 back to back to form the top member and the same for the bottom members. These members are trussed together with flats 27 in a manner such that the tension member or the one most nearly horizontal is single and placed between the vertical legs of the angles that are back to back. The compression members or the ones most nearly vertical are mounted in pairs and on the outside of the vertical legs of the angles back to back. Thus at each of the intersections of the tension, and compression truss members and the bottom and top angles two bolts 28 are inserted that tighten the truss into a rigid unit but which allows some yield over the entire length of the machine when necessary to prevent excessive fatigue and breakage. The trusses 21, 22, 23 and 24 are brought together at their center ends and fastened by a common plate 29 between the truss angles both bottom and top. The frame is then completed into a rectangular shape by the installation of the front and rear frame units 30 and 31. The frame is then braced in all directions with common type braces 32 bolted to the inside horizontal flanges of the trussed angles.

Swiveling wheel posts 33 are inserted into sleeves 34 at each corner of the rectangular frame 20. The frame 20 at each corner is supported on steering arms 35 that are welded to the wheel posts 33. The free ends of the two steering arms 35 of each post are bolted and connected together with two tie rods 36.

The other end of the drag link 37, in front is welded to a hitch post 39 which rotates in a top bearing 40 fastened beneath the main frame front cross piece 30 and a bottom bearing 41 fastened to the hitch structure shown in FIG. 10 under the front section of the main frame 20. To this post 39 are welded two plates 42, 43 which provide a flat bearing surface. To these plates 42, 43 is fastened a tongue 44 which moves freely in the vertical plane but rotates the hitch post 39 when moved in the horizontal plane. To the same hitch post 39 and above the drag link 37 is welded a front cable steering arm 45 that extends a distance on each side of the post 39 and perpendicular to the drag link 37.

Moving to the rear and referring also to FIGURES 14 and 15 as well as 5 through 9 it is noted that the drag link 38 is welded at one end to a rear steering post 46. This post 46 is vertical as the front hitch post 39 and is journalled between a top bearing 47 fastened under the main frame rear cross piece 31 and a bottom bearing 48 mounted to a rear steering structure beneath the main frame near cross piece 31. To the rear steering post 46 and above the drag link 38 is welded a chain sprocket 49. Resting on the sprocket 49 and between it and the bearing 47 and placed on the shaft and in a free journaling condition is the rear cable steering arm 50 identical in length to 45 of the front. To the front of this sleeved cable steering arm 50 and at its center and in the same plane is welded an off-set locking lug 51.

Immediately behind the main frame rear crosspiece 31 and fastened to them is a hand steering wheel 52 and steering column 53 at the bottom of which is securely fastened a small chain sprocket 54 of matching pitch to the sprocket 49. The two sprockets 49 and 54 are then connected with a chain 55.

A T type bracket 56 is welded to the top of drag link 38 between two apertures 57 in link 38. To the top rear tie rod 36 is fastened a lug 58.

The outer ends of the front cable steering arm 45 and the rear cable steering arm 50 are connected by cables 59 which cross each other at a point midway between the two steering arms 45 and 50. Tension in the cables may be adjusted by turnbuckles at one end of each cable 59.

As the tongue 44 is moved horizontally it rotates hitch post 39 and through parts 37, 35, and 36 the front wheels 61 are cut in the direction of movement of the tongue 44. The cable arm 45 being fastened to post 39 also rotates in the same direction. As front cable arm 45 is connected to rear cable arm 50 by crossed cables 59, the rear arm 50 rotates in a direction opposite to that of arm 45. As rear arm 50 and a connected bracket 51 are fully journaled on the rear post 46, they will rotate freely as the tongue 44 and front wheels are moved in either direction.

When rear cable arm 50 is thus free to journal on the post 46 the rear wheels 63 are then controlled by a rear driver with the steering wheel 52 and column 53. A rear driver is most commonly used during highway transport for making short, tight turns and maneuvering in close places.

When the aperture 51a of locking lug 51 is brought in line with rear aperture 56b of T bracket 56 and rear aperture 57 of drag link 38 FIGURE 15 and pin 64 inserted through these three apertures, the rear cable steering arm 50 through lug 51 is locked to drag link 38 and as the front wheels 61 are cut in either direction, steering arm 50 is no longer free to journal about the rear post 56 but moves drag link 38 and tie rods 36 as it moves and thus cuts the rear wheels 63 in a direction opposite to that of the front wheels 61 inasmuch as the steering cables 59 are crossed. This wheel movement arrangement forces the rear end to follow the front end on turns instead of cutting across in a smaller radius as is common to four-wheel vehicles with fixed rear wheels. This characteristic is most desirable in field operations for ease of maneuvering and efficient leveling around the turns.

When the pin 64 is removed from the three apertures 56b, 51a and 57 and put through apertures 56a, 57a and front aperture of 57 it releases the rear cable steering arm 50 to again journal freely about the rear steering post 46 as the front wheels 61 are cut but it locks drag link 38 and tie rods 36 into a fixed position and accordingly locks the rear wheels 63 in a straight-forward position which makes the implement into a conventional wagon type four-wheel operation. This will be infrequently used and it is for limited operations where a rear driver is not available and the tractor operator desires to move short distances.

For rear manual steering the pin 64 is removed from all apertures and allowed to hang free.

This type four-wheel steering provides positive steering and control at all times of operation and transport. It, in effect, reduces the problem of length to that of a short machine in maneuverability and control. As an additional feature during operation, when the soil load becomes unbalanced and tends to force the machine sideways, this automatic steering feature resists this side thrust in direct proportion and returns the machine to the straight trailing position.

Referring more particularly to FIGURES 4 through 9, the soil-moving unit 65 is suspended under the frame and fastened thereto by four fastening arms 66 which journal around a pin 67 through both ends and the four operate in a parallel plane. There are three dirt-moving moldboards 68a, 68b, and 68c fastened to a subframe 69 which is an all-welded unit made of two longitudinal members 70, 71 of a specific length which are fitted directly under the truss members of the main frame 20. These two members 70, 71 are connected into a rigid unit by three traverse members 72, 73, and 74 that are set in an angular position from perpendicular with the longitudinal members 70, 71 but in the same plane. All members are of square or rectangular type tubing for strength and relative lightness. The moldboards 68a, 68b, and 68c are fastened directly to these angular, traversely located members. Near the front and rear ends of the subframe 69 are located two similar tubular members 75 and 76 that connect the longitudinal members 70, 71 and are located perpendicular with them and in the same plane. Lifting brackets 77 are fastened to these members.

The first and second moldboards from the front 68a and 68b are identical in length and construction. The third or rear moldboard 68c is similar to 68a and 68b in construction but is longer. All three moldboards are positioned on the subframe 69 at predetermined angles and relationships of location with each other for maximum efficiency. The blades of moldboard 68a and 68b are set to do most of the rough cutting. The second blade from the front, or center moldboard 68b, catches the soil from the first and moves what does not drop out on to the third, or rear blade 68c. In addition to receiving the soil from the second blade 68b, this third board 68c reaches out beyond the first 68a and catches the ridge of "run-around" soil from the first. Thus the rear blade 68c smooths behind the cutting width of the first two and due to its greater distance from the front wheels 61 this blade will cut additional depth from the ridges left by the first two. The general object is to move the dirt from one blade to the other at a controlled rate so that most of it will have dropped out before reaching the end of the rear blade 68c.

All three moldboards 68a, 68b, and 68c are clamped to the subframe 69 by brackets 78 in rear of the moldboards. At the front end of the bracket 78 a mounting plate 79 is journally connected at 80. A knee brace 81 is journally connected at the lower end of mounting plate 79 by its bottom end and its top end is similarly connected in one of the several apertures 82 in the bracket 78. This forms a rigid triangular mounting arrangement for the moldboards. Plate 79 is journally connected to bracket 78 at 80 and is bolted to plate 83 through apertures at top and bottom of the plate. Two plates 83 are welded to the back of each moldboard. The apertures at top and bottom of plate 83 are slotted so that vertical adjustment of each moldboard may be made independently of each other. The tilt of each moldboard may be varied by moving the top end of the brace 81 along the apertures 82. This adjustment is desirable for different soil conditions. By removing brace 81 completely out of position the moldboards 68a, 68b, and 68c may be rotated backward and upward 90° and the apertures in brackets 84 line up with openings 82 and a bolt may be inserted to hold the boards in that position. This is also for additional clearance during transport.

The subframe 69 to which the moldboards 68a, 68b, and 68c are attached is fastened to the main frame 20 at four or more points and moves in a vertical plane about the arc of arms 66 in a parallelogram manner. Hydraulic pressure is applied to a ram 86 from a hydraulic pump on the tractor (not shown) and rotates rocker shafts 87. These two shafts 87 are connected by a connector bar 88 so that both rotate together. As the rocker shafts 87 begin to rotate, an adjusting screw 89 becomes an intermediate linkage and begins to rotate about a horizontal axis at both ends or connecting points. This compensates for the circular movement of the frame about the arms 66. This upward movement and compensation continues until the ram 86 is completely extended and the arms 66 are approximately horizontal.

This raising action brings the subframe 69 and all three blades 68a, 68b, and 68c up at the same rate, equal and parallel each increment of the way.

Lowering the unit is done in reverse by releasing the hydraulic pressure in the ram 86 and lowering until it reaches the bottom of the cradle formed by arms 66 and screws 89. At this point a single action line is formed extending from the lower swivel point of screw 89 through the rotating center axis of shaft 87 and thereby locks the subframe 69 from further movement up or down until the rocker shaft 87 through its rotation breaks this resistance line and begins the pickup.

Vertical cutting adjustments are made with the screws 89, one of which is located near each corner of the subframe 69. Within limits of the parallelogram, these screws 89 may be adjusted individually and thereby vary the depth of each of the four corners of the subframe 69 individually. However, beyond the limits of the parallelogram the four screws 89 must all be adjusted in proportion. Each time the subframe unit 69 is raised for any operating purpose and again lowered it returns to the original locked, cradled position.

Although I have disclosed herein the best form of the invention known to me at this time, I reserve the right to all such modifications and changes as may come within the scope of the following claims.

What I claim is:

1. A land surface preparation machine for surface shaping a cultivatable field comprising an elongated rectangular frame, wheels mounted for horizontal movement about their vertical axis at the corners of said frame, a subframe pivotally linked by rigid links to said elongated rectangular frame and mounted in said rectangular frame for vertical elevation, a plurality of mold boards carried by said subframe beneath said subframe and having substantially horizontally disposed earth cutting edges, and means connected between said rectangular frame and said subframe for elevating and lowering in positive increments said subframe and positively varying the distance between said subframe and said rectangular frame to maintain a predetermined constant cutting depth between said mold boards and said rectangular frame.

2. A machine as claimed in claim 1 wherein said mold boards are secured to the subframe at an angle to a right line with the line of draft of said machine and wherein said mold boards are staggered and overlap the path of each preceding mold board.

3. A machine as claimed in claim 2 wherein the rearmost mold board of said plurality is longer in length than the preceding mold boards with respect to the direction of travel of said machine.

4. A machine as claimed in claim 1 wherein said mold boards are pivoted proximate their tops to said subframe and adjustable inclination retaining means is connected between said subframe and mold board to vary the vertical angle of the mold board.

5. A machine as claimed in claim 1 wherein said last named means comprises a hydraulic ram and elevating linkage connected between said rectangular frame and said subframe.

6. A machine as claimed in claim 1 wherein said elevating means comprises a hydraulic piston and cylinder, said cylinder being pivotally mounted to said main frame and said piston being connected to said subframe through a linkage.

References Cited in the file of this patent

UNITED STATES PATENTS

| | | |
|---|---|---|
| 1,158,805 | Haynes | Nov. 2, 1915 |
| 1,234,952 | Stewart | July 31, 1917 |
| 1,335,906 | Moats | Apr. 6, 1920 |
| 1,373,236 | Gosch | Mar. 29, 1921 |
| 1,413,803 | Smith | Apr. 25, 1922 |
| 1,759,647 | Kincannon | May 20, 1930 |
| 1,797,288 | Gustafson | Mar. 24, 1931 |
| 2,029,540 | Porteous | Feb. 4, 1936 |
| 2,304,075 | Davidson et al. | Dec. 8, 1942 |
| 2,354,830 | Reid | Aug. 1, 1944 |
| 2,796,685 | Bensinger | June 25, 1957 |
| 2,822,628 | Arps et al. | Feb. 11, 1958 |
| 2,848,246 | Ruf | Aug. 19, 1958 |

FOREIGN PATENTS

| | | |
|---|---|---|
| 4431/26 | Australia | Sept. 21, 1927 |